Sept. 28, 1965  YOSHITO HAYASHI  3,208,334
APPARATUS DETERMINING TIME FOR ENLARGED
PRINTING OF PHOTOGRAPHS
Filed Nov. 30, 1962
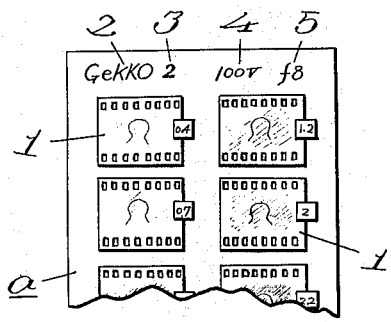
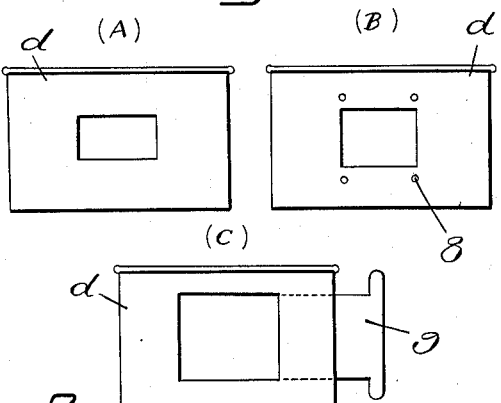
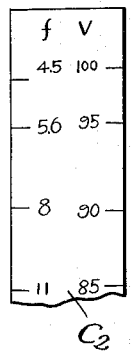
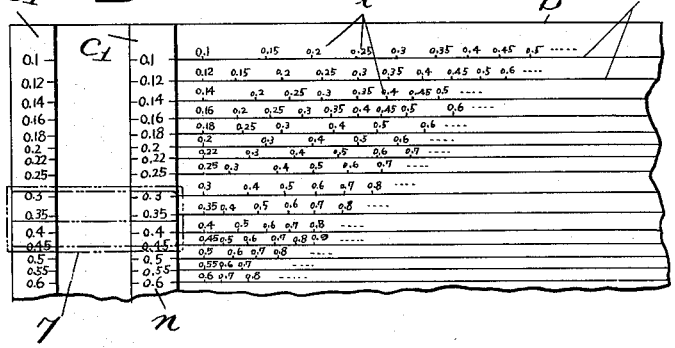
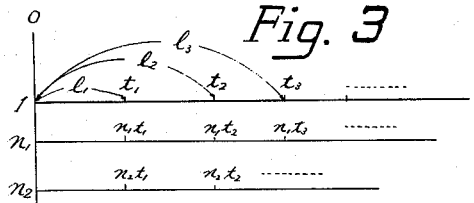
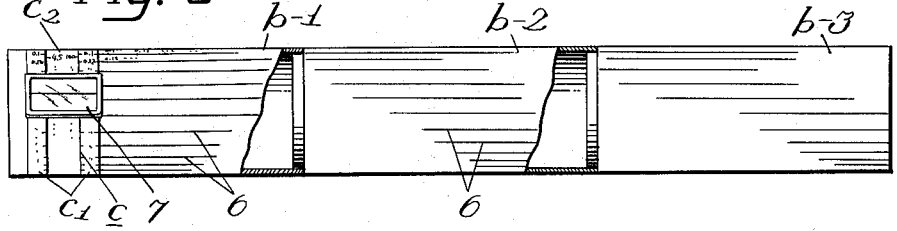
INVENTOR.
YOSHITO HAYASHI
BY

United States Patent Office 3,208,334
Patented Sept. 28, 1965

3,208,334
APPARATUS DETERMINING TIME FOR ENLARGED PRINTING OF PHOTOGRAPHS
Yoshito Hayashi, Toshima-ku, Tokyo, Japan, assignor to Apera Co. Ltd., Tokyo, Japan
Filed Nov. 30, 1962, Ser. No. 241,397
4 Claims. (Cl. 88—24)

The present invention relates to an apparatus determining time for enlarged printing of photographs.

The object of the present invention is to supply an apparatus for determining time for enlarged printing of photographs enabling even amateurs easily to print enlarged pictures without employing a high priced exposure meter and also without trial printing.

Another object of this invention is to supply an apparatus for determining time for enlarged printing of photographs eliminating the necessity of any development solution, any fixing solution, and the like, necessary for trial printing, and also entirely eliminating failures in enlarged printing.

Still another object of this invention is to supply an apparatus for determining time for enlarged printing of photographs, beautiful in appearance and simple in operation.

In consideration of the above objects and other objects, which will be described hereinbelow, the arrangement of parts of the apparatus is described in the following specification and in the claims hereof.

In the accompanying drawing showing an embodiment according to this invention, FIG. 1 shows the plan view of a plate, partly cut off, to which are attached a plurality of sample films; FIG. 2 the plan view of a line plate, partly cut off, for determining time for enlarged printing, laid flat, FIG. 3 an explanatory diagram for explaining the method of determining the graduations of the said line plate; FIG. 4 the plan view of a slide rule, partly cut off, with graduations for varying the number of seconds for printing with the variation of the voltage of electric source, and with graduations for varying the number of seconds for printing with differences in the diaphragm opening of the enlarging lens; FIG. 5 a side view of the line plate, partly cut off, for determining time for enlarged printing, rolled into a cylindrical shape, and in FIG. 6(A), (B), and (C) show, respectively, the plan view of each negative mask.

Now, describing an embodiment according to this invention with reference to the accompanying drawings, (a) indicates a plate to which are attached a plurality of sample films, $1, 1 \ldots$ and the plate (a) is a semi-transparent plate of frosted glass or milky synthetic resin or the like and is provided with indications, on the upper part thereof, of various conditions such as 2 the name of a printing paper, "Gekko" for instance, 3 the grade of hardness or softness of the printing paper, 2 for instance, 4 the voltage of electric source, 100 V. for instance, 5 the opening of the diaphragm of the enlarging lens, $f8$ for instance. The sample films $1, 1 \ldots$ are developed pictures of a single or various objects, preferably human figures included therein, taken under different and varied conditions and are arranged on the plate (a) in order of the degrees of opacity of the films, and the number of seconds, $(t), (t) \ldots$ for proper printing in the case of minimum ratio of enlargement obtainable by the sample films $1, 1 \ldots$ are to be indicated at the equivalent position of each of the sample films $1, 1 \ldots$ and all of the said numbers of second $(t), (t) \ldots$ for proper printing are to be determined by actual experiments.

Describing the method for determining the number of seconds $(t), (t) \ldots$ proper printing time is first determined for the case of minimum enlargement ratio by using the standard sample film 1 under the condition wherein said various provisions for enlargement are fulfilled, and when such time is 1 second, the number of seconds for proper printing of the sample film 1 is defined as 1.

By having, next, each of other sample films of varied degrees of opacity is similarly measured with the first sample film as the standard, the number of seconds for proper printing for each of the sample films is determined.

The number of seconds $(t)$ for the minimum enlargement ratio thus obtained for each sample film is now provisionally defined as the line coefficient $(n)$.

Next, (b) in FIG. 2 being a line plate for determining time for enlarged printing, on the left side thereof the line coefficients $(n)$ of said sample films $1, 1 \ldots$ are vertically indicated thereon in order with logarithmic graduations, and horizontal lines 6 are drawn in alignment with each of the graduations of said line coefficients.

Then, on the line 6 of each line coefficient $(n)$ the number of seconds $(t)$ for proper printing is again indicated at the position of width for the case of minimum enlargement ratio, measuring from the base line 0–0′ at the left end of the line plate (b) (see FIG. 3).

Now, describing the method for determining the number of seconds $(t)$ for proper printing in the case wherein enlargement ratio is varied, with reference to FIG. 3, the number of seconds for proper printing for each case, wherein the width of the focus plane of enlargement from the base line 0–0′ is measured with the sample film 1, the number of seconds $(t)$ of which for proper printing is 1 second, as the standard. That is, when the width of the focus plane of enlargement from the base line 0–0′ would vary as $1_1, 1_2 \ldots$ and the number of seconds $(t), (t) \ldots$ for proper printing would vary as $t_1, t_2 \ldots$ in accordance therewith, $t$ should be indicated at the position, where the length of one side enlarged by the enlarging machine is $1_1$, and $t_2$ at the position where the length is $1_2$, and so on, and the number of second for proper printing, $t_1, t_2 \ldots$ are indicatable, respectively, on the line 6 by determining through similar experiments in order.

Thus, numerous numbers of seconds $t_1, t_2 \ldots$ for proper printing are determined corresponding to the variation of enlargement ratio against the sample film 1, wherein the line coefficient $(n)$ is 1.

Thereupon, each of the line coefficients is equivalent to the order of opacity of each of the sample films $1, 1 \ldots$ and as the quantity of light passing through each of the sample films $1, 1 \ldots$ is inversely proportional to the shade thereof, the quantity of light passing through each of the sample films per unit time decreases as the line coefficient increases, and in consequence, the quantity of light passing through the film is inversely proportional to the line coefficient thereof.

As a result thereof, in regard to the condition for enlargement of $1_1, 1_2, 1_3 \ldots$ with the line coefficient $n_1$, the number of seconds $(t)$ for proper printing are, respectively, indicated by $$n_1 t_1, n_1 t_2, n_1 t_3 \ldots$$

and in regard to the condition of enlargement for $1_1, 1_2, 1_3 \ldots$ with respective line coefficent $n_1, n_3 \ldots$ the number of seconds $(t)$ for proper printing are, respectively, obtainable as:

$$n_2 - n_1 t_1, n_2 t_2, n_2 t_3 \ldots$$
$$n_3 - n_3 t_1, n_3 t_2, n_3 t_3 \ldots$$

and so on.

The numbers of seconds $(t)$ for proper printing thus obtained are indicated in order on each of respective lines 6.

However, the variation in the voltage of electric source specially, among other conditions, for the enlargement of pictures specially affects the time for proper printing. Hence, on one side of the line plate ($b$) for determining time for proper enlarged printing a slide rule mechanism ($c$) is provided for indicating in a simple manner the variation of the number of seconds ($t$) for proper printing against the variation of the voltage of electric source.

The said slide rule mechanism ($c$) has the said line coefficients ($n$) ndicated on its stationary rule ($c_1$), and has, on one side of its movable rule ($c_2$), varying graduations (V) indicated for the number of seconds in accordance with the variation of the voltage of electric source, and varying graduations ($f$) for the number of seconds for proper printing in accordance with varied opening of the diaphragm of the enlarging lens, in addition, there are provided logarithmic graduations indicating the ratios of the variations of printing time necessary for making printed papers of equal opacity with the varied voltage in the electric source, together with the variation in the opening of the diaphragm on the enlarging lens. The slide rule is provided further with a slider 7 having a cursor line on the surface thereof. ($d$) in FIG. 6 are negative masks to be used for different sizes of film and, (A) indicates the standard negative mask for 35 mm. film, (B) a negative mask for films of semi-standard size and provided on the four corners thereof with holes 8 at the positions corresponding to the size of negative mask for the standard 35 mm. film, and (C) indicates a negative mask for a large sized film, 6 x 6 cm. for instance, and is provided with a shutter plate 9 so arranged as to be stopped leaving the width of 35 mm. film when shifted. When enlargement is made with a large sized film, the projection area of the negative mask is made equal to the width of 35 mm. film, thereby the number of seconds ($t$) for proper printing is determined, and printing is performed with that number of seconds ($t$) for printing in the condition of having the shutter plate 9 removed.

In the case as shown in FIG. 5 the line plate ($b$) for determining time for enlarged printing is rolled into a cylindrical shape, and also it may be so divided into several parts like ($b$-1), ($b$-2), ($b$-3), and so on, as to be combined with the parts thereof, for the sake of convenience in carrying and for the simplicity in handling.

Now, basing on the constitution of this invention as described above, the method of use thereof is described in order in the following:

(1) In an open place, a negative film to be enlarged is compared with the sample film 1 of FIG. 1, and the type number of printing paper, and the number of seconds for proper printing with minimum enlargement ratio are determined by their comparative transparency and opacity, and to be noted on paper together with the type number of the film.

(2) the negative film to be enlarged is inserted together with a negative mask into an enlarging machine, and is brought into focus at a size desired.

(3) Enlargement conditions are made equal to the conditions indicated on the plate of FIG. 1, except the conditions for electric voltage and the ratio of enlargement.

(4) By having the line plate ($b$) (FIG. 2) for determining time for enlarged printing placed on the plane of enlarging focus, the number of seconds for printing with minimum enlargement ratio previously noted is sought on the stationary rule ($c$) of the slide rule.

(5) Have on the graduations of voltage and on the graduations of the opening of the diaphragm on the movable rule of the slide rule (FIG. 2 or 5) marked beforehand, at the same positions as the conditions of the voltage and the opening of the diaphragm indicated on the sample film plate of FIG. 1.

(6) The voltage of electric source immediately before enlargement operation is detected by a voltmeter.

(7) By having the movable slide rule ($C_2$) (FIG. 5) moved up and down, the mark on the voltage graduations is made to coincide with the logarithmic number on the stationary rule ($C_1$) obtained in 4 above, and the cursor line of the slider 7 is made to coincide with the position of the voltage obtained in 6 above.

(8) By having the left end of the projected enlarged image coincide with the left end of the stationary rule ($C_1$), the crossing point of the cursor line with the right and of the focus plane is sought, and the number of seconds ($t$) indicated thereon is read. That is the number of seconds ($t$) sought for proper enlarged printing.

(9) When the opening of the diaphragm of the lens is to be changed, the mark on the graduations ($f$) of the opening of the diaphragm being made to coincide with the cursor line, by the line pointed by the graduation ($f$) of the changed opening of the diaphragm of the lens the number of second ($t$) for printing is determined.

(10) When enlargement is to be performed with a semi-standard film, the negative mask ($d_1$) of (B) of FIG. 6 is used. As the holes 8 of the negative mark ($d$) thereof will appear on the focus plane, the number of seconds ($t$) is determined by the spacing between the holes.

In the case with a large sized film, the negative mask ($d$) of (C) of FIG. 6 is used. After having been brought into focus at a desired size, the movable shutter plate 9 provided in the negative mask ($d$) is shifted until it stops, and the film to be enlarged is cut to the width of 35 mm. film and the number of seconds ($t$) is read on the focus plane, and then printing is performed with that number of seconds ($t$) by having the movable shutter plate 9 shifted to its original position.

(11) In the procedure described above, in the case of an intermediate number between the logarithmic numbers on the stationary rule ($C_1$), respective number of second ($t$) is sought by the lines upper and lower thereof, and thereby a proportional intermediate number of seconds is determined.

According to this invention, with films of any size pictures can be enlarged to any desired sizes, as described above, and the invention is characterized in that any high priced exposure meter and voltage regulator are made unnecessary and the trouble of trial printing is entirely eliminated, and the enlargement is performed in a very efficient manner.

An embodiment according to this invention has been described hereinabove, but this invention is not restricted to the embodiment described above, and it is apparent that the invention includes all the constructions within the scope of the claims hereof.

By having the present invention described as above, what is claimed for patent by Letters Patent is:

1. Apparatus for determining time for enlarged printing of photographs, consisting of a plate provided with indications of enlarging conditions, such as the brand of printing paper, the type number thereof, the voltage of electric source, and the opening of the diaphragm of the lens, and the like, and having a plurality of sample films of different opacities attached thereon with respective numbers of seconds for proper printing in minimum enlargement ratio, and a line plate provided with negative masks inserted therein, with indications of line coefficients thereon in vertical direction, and time indication means arranged in order in a horizontal direction from a base line for determining correct printing time corresponding to a selected enlargement ratio as measured along said line coefficients from said base line.

2. Apparatus for determining time for enlarged printing as claimed in claim 1, provided with a movable slide rule with graduations for changing the number of seconds for proper printing according to the variations of the voltage of electric source on one side of the said line plate for determining time for enlarged printing, and a stationary slide rule with indications of the line coefficients, respectively represented by logarithmic graduations.

3. Apparatus for determining time for enlarged printing as claimed in claim 1 provided with graduations for changing the number of seconds for proper printing according to different openings of the diaphragm of the enlarging lens.

4. Apparatus for determining time for enlarged printing of photographs as claimed in claim 1 wherein the line plate for determining time for enlarged printing is a cylindrical shape and also divisible into a number of parts thereof, and combinable with the parts thereof as desired.

References Cited by the Examiner
UNITED STATES PATENTS

| | | | |
|---|---|---|---|
| 2,071,195 | 2/37 | Bowles | 235—64.7 |
| 2,207,375 | 7/40 | Friedell | 235—64.7 |
| 2,233,614 | 3/41 | Krotoschiner | 235—64.7 X |
| 2,235,590 | 3/41 | Rockwell | 235—64.7 X |
| 2,253,231 | 8/41 | Friedell | 88—14 X |
| 2,495,529 | 1/50 | Larson | 235—64.7 |
| 2,535,119 | 12/50 | Bush | 235—64.7 |
| 2,721,032 | 10/55 | Gresham | 235—64.7 |

NORTON ANSHER, *Primary Examiner.*